(12) United States Patent
Scott

(10) Patent No.: US 11,934,395 B2
(45) Date of Patent: *Mar. 19, 2024

(54) EFFICIENT EXTRACTION OF LARGE DATA SETS FROM A DATABASE

(71) Applicant: Oracle International Corporation, Redwood Shores, CA (US)

(72) Inventor: Adrian Graham Scott, Morgan Hill, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,116

(22) Filed: Aug. 22, 2022

(65) Prior Publication Data

US 2022/0398249 A1    Dec. 15, 2022

Related U.S. Application Data

(63) Continuation of application No. 16/657,517, filed on Oct. 18, 2019, now Pat. No. 11,423,020.

(60) Provisional application No. 62/748,209, filed on Oct. 19, 2018.

(51) Int. Cl.
| | |
|---|---|
| *G06F 16/2453* | (2019.01) |
| *G06F 16/21* | (2019.01) |
| *G06F 16/22* | (2019.01) |
| *G06F 16/248* | (2019.01) |

(52) U.S. Cl.
CPC ...... *G06F 16/24535* (2019.01); *G06F 16/211* (2019.01); *G06F 16/221* (2019.01); *G06F 16/248* (2019.01)

(58) Field of Classification Search
CPC ............ G06F 16/24535; G06F 16/221; G06F 16/211; G06F 16/248
See application file for complete search history.

(56) References Cited

U.S. PATENT DOCUMENTS

| | | | |
|---|---|---|---|
| 9,348,880 B1* | 5/2016 | Kramer | G06F 16/258 |
| 2003/0212694 A1* | 11/2003 | Potapov | G06F 16/24557 |
| 2004/0064456 A1* | 4/2004 | Fong | G06F 16/283 |
| 2004/0083204 A1 | 4/2004 | Dettinger et al. | |
| 2005/0223032 A1 | 10/2005 | Shan et al. | |

(Continued)

OTHER PUBLICATIONS

U.S. Appl. No. 16/657,517, Final Office Action dated Mar. 8, 2021, 12 pages.

(Continued)

*Primary Examiner* — Kris E Mackes
*Assistant Examiner* — Tiffany Thuy Bui
(74) *Attorney, Agent, or Firm* — Kilpatrick Townsend & Stockton LLP

(57) ABSTRACT

A method of efficiently extracting large data sets from a database may include receiving a first result set from a first query executed on one or more data sources. The one or more data sources may use a first schema when the first query was executed. The method may also include receiving a second result set from a second query executed on the one or more data sources. The one or more data sources may use a second schema when the second query was executed. The method may further include generating a view that combines the first result set and the second result set. The view may resolve differences between the first schema and the second schema.

19 Claims, 15 Drawing Sheets

(56) References Cited

U.S. PATENT DOCUMENTS

| | | | |
|---|---|---|---|
| 2008/0098173 A1 | 4/2008 | Chidambaran et al. | |
| 2008/0114752 A1* | 5/2008 | Friesenhahn | G06F 16/24534 |
| | | | 707/999.005 |
| 2010/0191760 A1* | 7/2010 | Kusumura | G06F 16/258 |
| | | | 707/767 |
| 2011/0113054 A1* | 5/2011 | McLean | G06F 16/8358 |
| | | | 707/769 |
| 2011/0252002 A1* | 10/2011 | Ben-Dyke | G06F 16/213 |
| | | | 707/661 |
| 2012/0296889 A1 | 11/2012 | Davydok et al. | |
| 2014/0019410 A1* | 1/2014 | Kemmler | G06F 16/25 |
| | | | 707/610 |
| 2014/0067868 A1* | 3/2014 | Kemmler | G06F 16/212 |
| | | | 707/E17.044 |
| 2014/0095462 A1* | 4/2014 | Park | G06F 16/24535 |
| | | | 707/706 |
| 2015/0317361 A1 | 11/2015 | Battaglia et al. | |
| 2016/0275191 A1 | 9/2016 | Keimatsu | |
| 2017/0091265 A1 | 3/2017 | Cao et al. | |
| 2018/0081938 A1* | 3/2018 | Khuong | G06F 16/256 |
| 2018/0285415 A1 | 10/2018 | Beavin et al. | |
| 2019/0018865 A1* | 1/2019 | Ivanov | G06F 16/258 |

OTHER PUBLICATIONS

U.S. Appl. No. 16/657,517, First Action Interview Pilot Program Pre-Interview Communication dated Nov. 2, 2020, 4 pages.
U.S. Appl. No. 16/657,517, Non-Final Office Action dated Oct. 4, 2021, 12 pages.
U.S. Appl. No. 16/657,517, Notice of Allowance dated Apr. 19, 2022, 17 pages.

\* cited by examiner

```
BEGIN
DBMS_CLOUD.CREATE_EXTERNAL_TABLE(
  table_name => 'EXAMPLE'
  credential_name => 'SECURE'
  file_url_list => 'http://../tmp/ExamplePVO*.csv',
  column_list => 'ColA VARCHAR(20), ColB VARCHAR(20), ColC VARCHAR(20),
  field_list => 'ColA, ColB, ColC',
  format => json_object('type' VALUE 'CSV') );
END
```
508

FIG. 5B

EFFICIENT EXTRACTION OF LARGE DATA SETS FROM A DATABASE

CROSS-REFERENCE TO RELATED APPLICATION

The present application is a continuation of U.S. application Ser. No. 16/657,517, filed Oct. 18, 2019, which is incorporated herein by reference. U.S. application Ser. No. 16/657,517 claims the benefit of U.S. Provisional Application No. 62/748,209, filed Oct. 19, 2018, which is incorporated herein by reference.

SUMMARY

In some embodiments, a method of efficiently extracting large data sets from a database may include receiving a query to be executed on a first view of one or more data sources. One or more queries on the first view may have been previously executed. One or more previous result sets resulting from the one or more queries may be stored separately from the one or more data sources. The method may also include receiving a current result set from the one or more data sources that is responsive to the query. The query may be reformatted before the query is executed on the one or more data sources such that the result set does not overlap with the one or more previous result sets. The method may additionally include generating a second view that combines the current result set and the one or more previous result sets. The second view may resolve changes in a schema of the one or data sources between when the one or more previous result sets were received and when the current result set is received.

In some embodiments, a non-transitory computer-readable medium may include instructions that, when executed by one or more processors, cause the one or more processors to perform operations including receiving a query to be executed on a first view of one or more data sources. One or more queries on the first view may have been previously executed. One or more previous result sets resulting from the one or more queries may be stored separately from the one or more data sources. The operations may also include receiving a current result set from the one or more data sources that is responsive to the query. The query may be reformatted before the query is executed on the one or more data sources such that the result set does not overlap with the one or more previous result sets. The operations may additionally include generating a second view that combines the current result set and the one or more previous result sets. The second view may resolve changes in a schema of the one or data sources between when the one or more previous result sets were received and when the current result set is received.

In some embodiments, a system may include one or more processors and one or more memory devices including instructions that, when executed by the one or more processors, cause the one or more processors to perform operations including receiving a query to be executed on a first view of one or more data sources. One or more queries on the first view may have been previously executed. One or more previous result sets resulting from the one or more queries may be stored separately from the one or more data sources. The operations may also include receiving a current result set from the one or more data sources that is responsive to the query. The query may be reformatted before the query is executed on the one or more data sources such that the result set does not overlap with the one or more previous result sets. The operations may additionally include generating a second view that combines the current result set and the one or more previous result sets. The second view may resolve changes in a schema of the one or data sources between when the one or more previous result sets were received and when the current result set is received.

In any embodiments, any of the following features may be included in any combination and without limitation. The method/operations may also include receiving a first schema for the one or more data sources prior to receiving the one or more previous result sets. The method/operations may also include receiving a second schema for the one or more data sources after receiving the one or more previous result sets. Generating the second view may include identifying a difference between the first schema and the second schema to generate code that creates one or more data tables that are referenced by the second view. The current result set may reorder columns that are in the one or more previous result sets. The current result set may add an additional column that was not part of the one or more previous result sets. The second view might not include the additional column. The method/operations may also include identifying the one or more previous result sets from among a plurality of previous result sets using an identifier for the first view. The method/operations may also include identifying the one or more previous result sets from among a plurality of previous result sets by grouping batches of result sets with same column headers.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 5B illustrates an example of code that may be automatically generated to provide a result table based on the previous result sets, according to some embodiments.

DETAILED DESCRIPTION

Described herein, are embodiments implemented as part of a Data Integration Platform Cloud (DIPC). In general, data integration involves combining data residing in different data sources and providing users with unified access and a unified view of the data. This process often arises and becomes significant in many situations, such as merging commercial entities with existing legacy databases. Data integration is beginning to appear more frequently in Enterprise software systems as the volume of data continues to increase along with the ability to analyze the data to provide useful results ("big data"). For example, consider a web application where users can query a variety of types of travel information (e.g., weather, hotels, airlines, demographics, crime statistics, etc.). Instead of requiring all of these various data types to be stored in a single database with a single schema, an Enterprise application can instead use the unified views and virtual schemas in the DIPC to combine many heterogeneous data sources such that they can be presented in a unified view to the user.

The DIPC is a cloud-based platform for data transformation, integration, replication, and governance. It provides batch and real-time data movement between cloud and on-premises data sources while maintaining data consistency with default-tolerance and resiliency. The DIPC may be used to connect to various data sources and prepare, transform, replicate, govern, and/or monitored data from these various sources as they are combined into one or more data warehouses. The DIPC can work with any type of data source and support any type of data in any format. The DIPC can use a Platform as a Service (PaaS) or Infrastructure as a Service (IaaS) architecture to provide cloud-based data integration for an Enterprise.

The DIPC may provide a number of different utilities, including transferring entire data sources to new cloud-based deployments and allowing cloud databases to be easily accessed from the cloud platform. Data can be streamed in real-time to new data sources up-to-date and to keep any number of distributed data sources synchronized. Loads may be divided amongst synchronized data sources such that they remain highly available to end-users. An underlying data management system can be used to reduce the amount of data moved over the network for deployments into a database cloud, a big data cloud, third-party clouds, and so forth. A drag-and-drop user interface can be used to execute reusable Extract, Load, and Transform, (ELT) functions and templates. Real-time test environments can be created to perform reporting and data analytics in the cloud on replicated data sources such that the data can remain highly available to end-users. Data migrations can be executed with zero downtime using duplicated, synchronized data sources. The synchronized data sources can also be used for a seamless disaster recovery that maintains availability.

Figure 1:
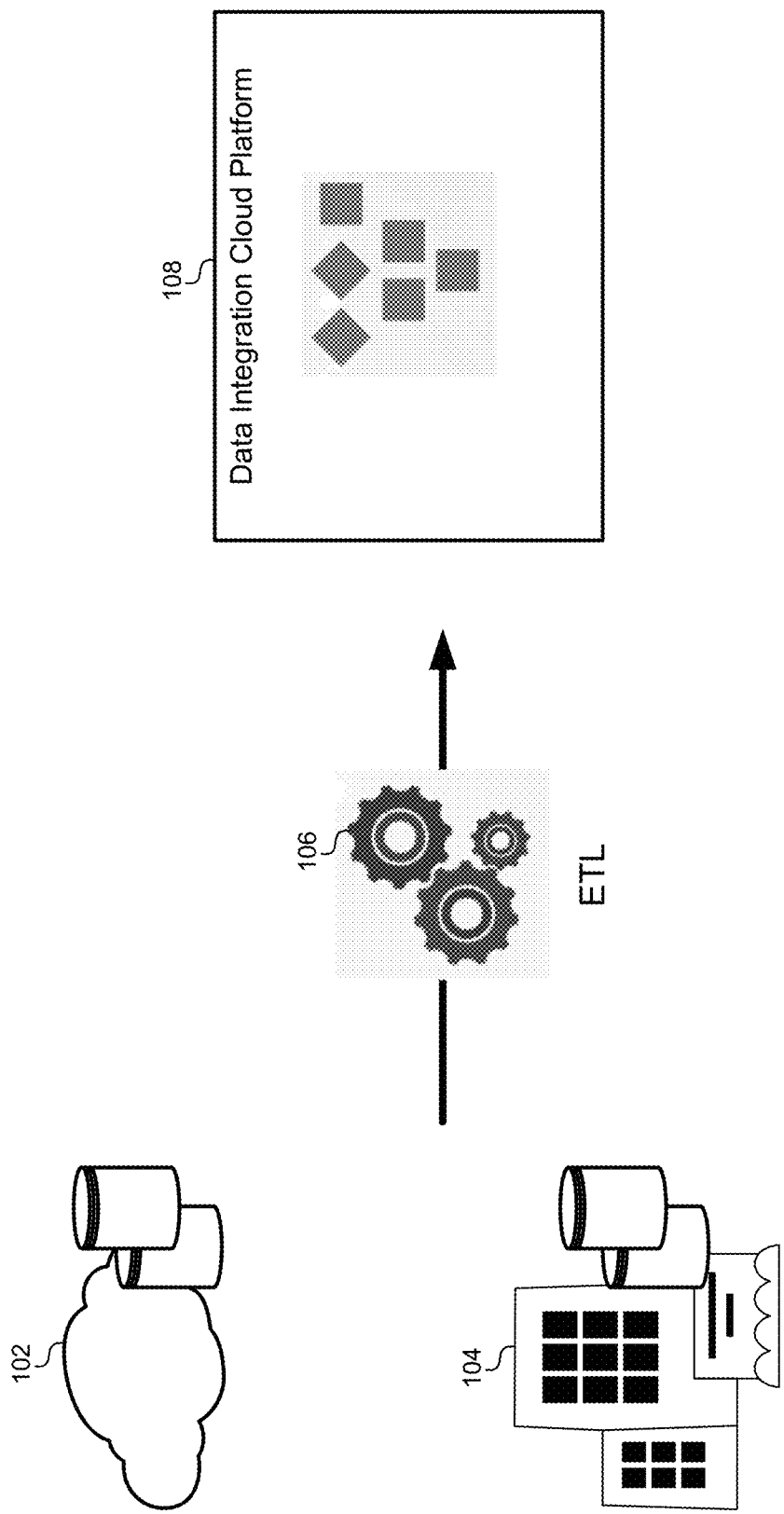
FIG. 1 illustrates a computer system architecture that utilizes the DIPC to integrate data from various existing platforms, according to some embodiments.

FIG. 1 illustrates a computer system architecture that utilizes the DIPC to integrate data from various existing platforms, according to some embodiments. A first data source 102 may include a cloud-based storage repository. A second data source 104 may include an on-premises data center. In order to provide uniform access and views to the first data source 102 and the second data source 104, the DIPC 108 can use an existing library of high-performance ELT functions 106 to copy data from the first data source 102 and the second data source 104. The DIPC 108 can also extract, enrich, and transform the data as it is stored in a new cloud platform. The DIPC 108 can then provide access to any big data utilities that are resident in or accessible by the cloud platform. In some embodiments, the original data sources 102, 104 may continue to provide access to customers, while replicated data sources in the cloud platform can be used for testing, monitoring, governance, and big data analytics. In some embodiments, data governance may be provided to profile, cleanse, and govern data sources within an existing set of customized dashboards in a user interface.

Figure 2:
FIG. 2 illustrates one of the customized dashboards in a user interface that can be used to configure, monitor, and control a service instance in the DIPC.

FIG. 2 illustrates one of the customized dashboards in a user interface that can be used to configure, monitor, and control a service instance in the DIPC 108. A summary dashboard 202 can provide a control 204 that allows users to create a service instance. Next, a series of progressive web forms can be presented to walk the user through the types of information used to create a service instance. In a first step, the user will be asked to provide a service name and description with an email address and a service edition type. The user may also be asked for a cluster size, which specifies a number of virtual machines used in the service. The service edition type determines which applications are installed on the virtual machines. In a second step and corresponding web form, the user may provide a running cloud database deployment to store the schemas of the DIPC server. The same database may later be used to store data entities and perform integration tasks. Additionally, a storage cloud may be specified and/or provisioned as a backup utility. The user may also provide credentials that can be used to access the existing data sources used in the data integration. In a third step, the provisioning information can be confirmed and a service instance can be created. The new service instance may then be displayed in the summary area 206 of the summary dashboard 202. From there, the user can access any information for any running data integration service instance.

Figure 3:
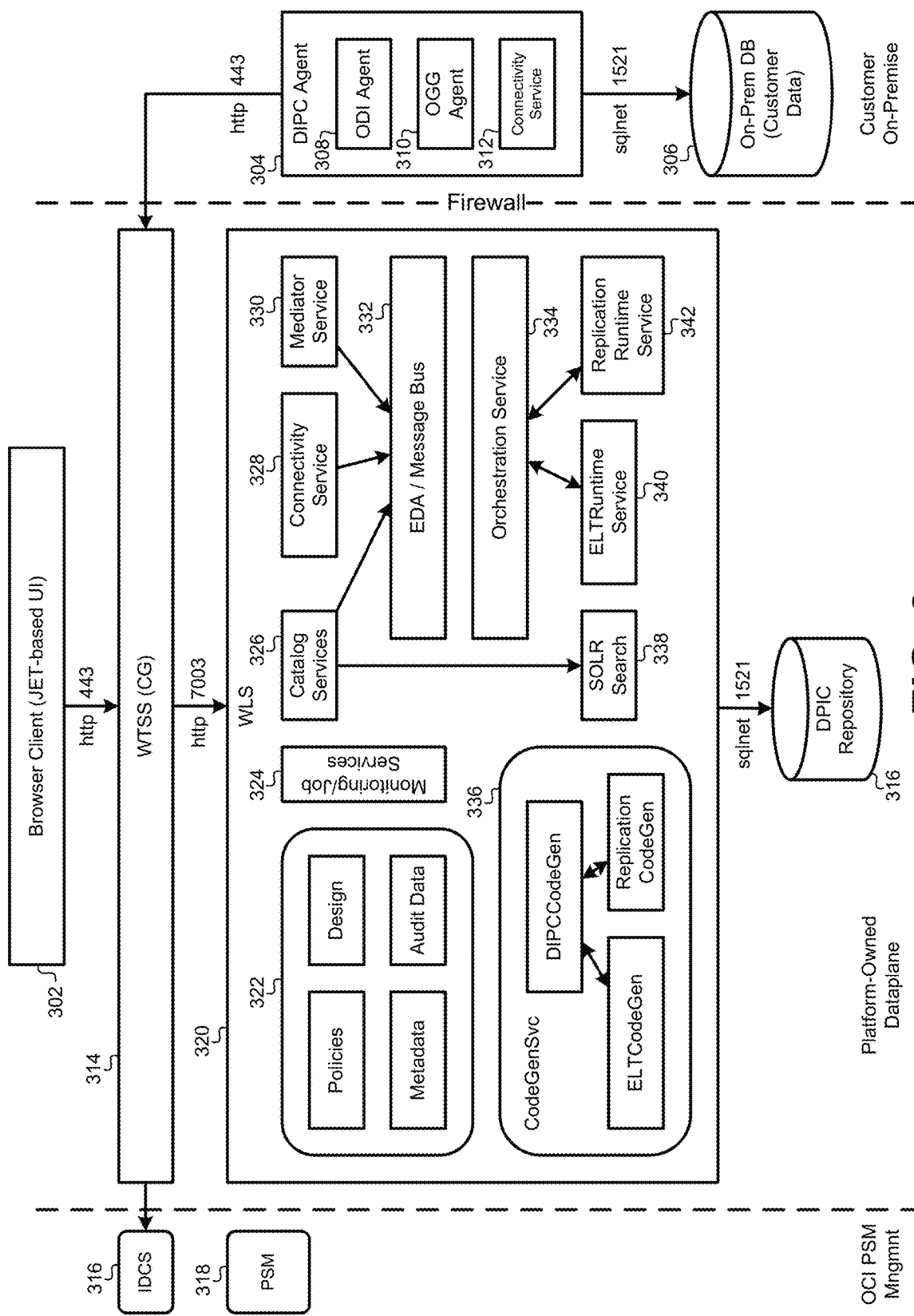
FIG. 3 illustrates an architectural diagram of the DIPC, according to some embodiments.

FIG. 3 illustrates an architectural diagram of the DIPC, according to some embodiments. Requests may be received through a browser client 302, which may be implemented using a JavaScript Extension Toolkit (JET) set of components. Alternatively or additionally, the system may receive requests through a DIPC agent 304 that operates at a customer's on-premises data center 306. The DIPC agent 304 may include a data integrator agent 308 and an agent 310 for a replication service, such as Oracle's GoldenGate® service. Each of these agents 308, 310 may retrieve information from the on-premises data center 306 during normal operations and transmit data using a connectivity service 312 back to the DIPC.

Incoming requests can be passed through a sign-in service 314, which may include load-balancing or other utilities for routing requests through the DIPC. The sign-in service 314 may use an identity management service, such as an identity cloud service 316 to provide security and identity management for the cloud platform as part of an integrated enterprise security fabric. The identity cloud service 316 can manage user identities for both the cloud deployments and the on-premises applications described in this embodiment. In addition to the identity cloud service 316, the DIPC may also use a PaaS Service Manager (PSM) tool 318 to provide an interface to manage the lifecycle of the platform service in the cloud deployment. For example, the PSM tool 318 can be used to create and manage instances of the data integration service in the cloud platform.

The DIPC can be implemented on a Web logic server 320 for building and deploying enterprise applications in the cloud environment. The DIPC may include a local repository 322 that stores data policies, design information, metadata, and audit data for information passing through the DIPC. It may also include a monitoring service 324 to populate the local repository 322. A catalog service 326 may include a collection of machine-readable open APIs to provide access to many of the SaaS and PaaS applications in the cloud deployment. The catalog service 326 may also be available for a search application 338 that uses a distributed indexing service, such as the Apache Solr®. A connectivity service 328 and a mediator service 330 can manage connections and provide transformation, validation, and routing logic for information that passes through the DIPC. Information within the DIPC may be passed using an Event Driven Architecture (EDA) and a corresponding message bus 332.

The DIPC may also include an orchestration service 334. The orchestration service 334 may enable automation tasks by calling REST endpoints, scripts, third-party automation frameworks, and so forth. These tasks can then be executed by the orchestration service 334 to provide the DIPC functionality. The orchestration service 334 can use run-time services to import, transform, and store data. For example, an ELT runtime service 334 can execute the library of ELT functions described above, while the replication runtime service 342 can copy data from various data sources into a cloud-deployed DIPC repository 316. Additionally, the DIPC may include a code generation service 336 that provides automatic code generation for both ELT functions and replication functions.

Large Data Extraction

Extracting data from a database has the potential to be a CPU-intensive activity, causing strain on the system and negatively impacting other users. It is also likely that multiple users may try to access the same data and the same time, especially as the most common data queries are encapsulated by well-defined and readily available View Objects. The embodiments described herein present a solution to this problem that is based around a new concept of only allowing queries to reach a database for data that has never been extracted before while still satisfying the original request in full by having the "caller" combine the staged results of multiple extraction requests on the same View Object.

A data extraction tool, such as the Oracle BI Cloud Connector®, can be used to solve part of the problem, because extracted data may represent a combination of multiple queries over time. It introduces the possibility that not all of the data exists in the same format. This may be due to schema changes occurring between extractions. To solve this portion of the problem, extracted data sets may be examined, and those of matching schemas may be grouped together for efficient loading into the target system by the embodiments described herein. Additionally, some of these target systems may require accurate information about the format of the data. To accommodate columns that may have been introduced to the result set after the task was designed, some embodiments may fetch a fresh version of a metadata definition via a REST call and augment the existing definition. This may then be used to generate the correct code to load data into the target system.

The solution can be divided into two sub-steps: one that occurs at design time and one that occurs at runtime. First, the design time steps may comprise designing an extraction task. To design the extraction task, the metadata for the well-defined View Objects may be retrieved from a database using a REST API call to a cloud connector that is configured to execute queries against a cloud database. A View Object is an encapsulated object that references other base tables in the database. It simply provides a view into one or more base table against which queries can be executed. However, the View Object is not persistent, so any information that may be used later needs to be stored in a separate file, such as a .CVS file.

Before designing the extraction task, the design time process may first use the REST API to retrieve a JSON file from the cloud connector in communication with the database. The JSON file may include a metadata definition for tables in the database. For example, the metadata definition may include column names, sizes, and data types for each column, such as strings, timestamps, dates, integers, and so forth. This metadata lets the process know the format of any information that may be retrieved via the extraction task. This DIPC harvesting uses the cloud connector Rest API to create data entities in the DIPC catalog described above. Through this interface, the system can obtain the information about the cloud connector data stores in the View Objects, such as column names, data types and data type parameters.

After retrieving the metadata, the extraction task itself may be formulated. The extraction task may be configured to extract certain objects from the database. The extraction task can also limit the information extracted from the database based on parameters provided as part of the task. For example, the extraction task can limit data that is received between a start date and an end date. The extraction task may comprise a query that will retrieve the desired data, and the DIPC code generation modules described above may generate the actual query code for the extraction task.

Figure 4:
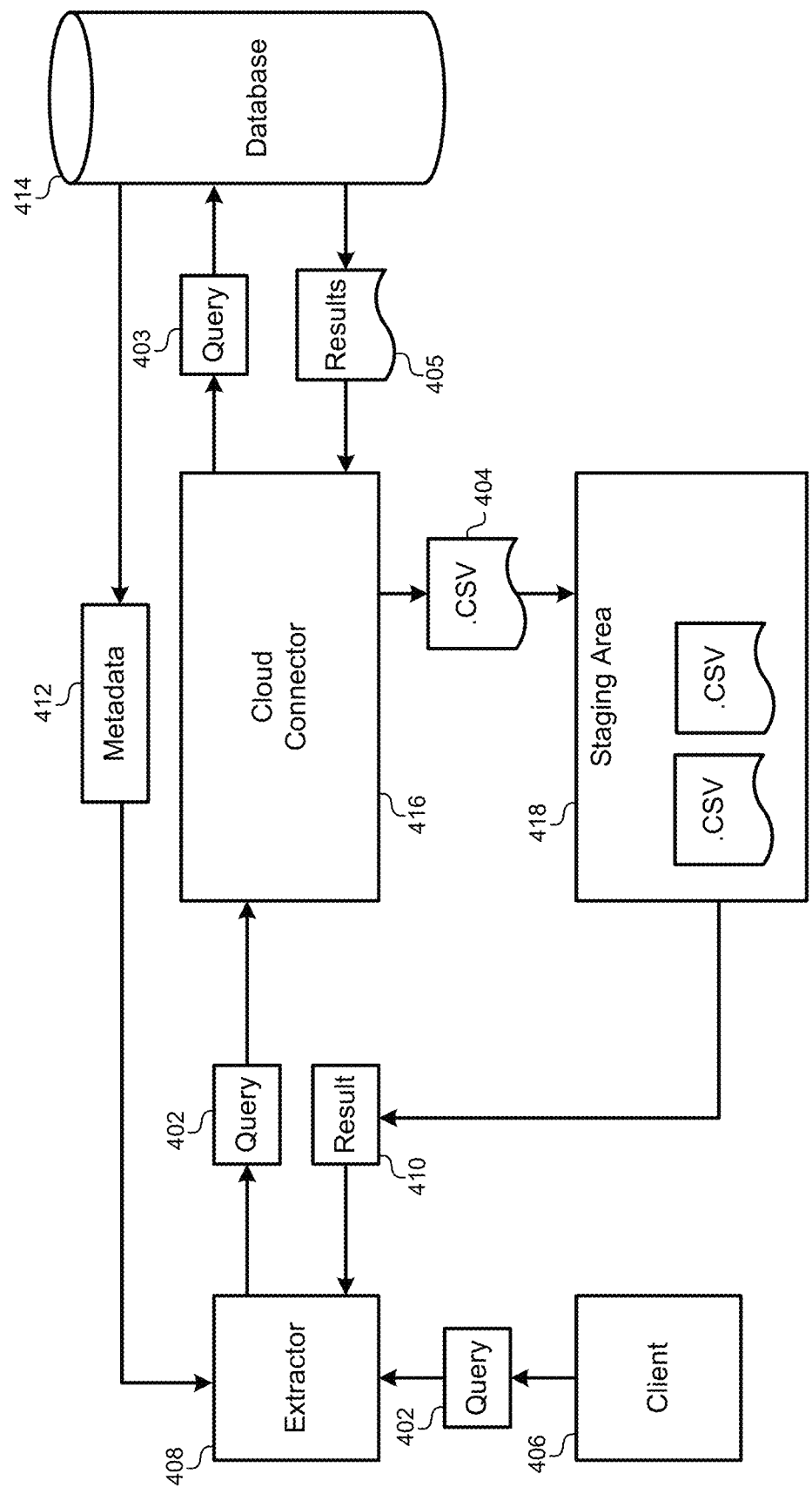
FIG. 4 illustrates a block diagram of a system for executing an extraction task at runtime, according to some embodiments.

FIG. 4 illustrates a block diagram of a system for executing an extraction task at runtime, according to some embodiments. The goal of this process is to minimize the amount of data that needs to be extracted from a database 414 in response to a query 402 from a client 406. Instead of sending the query directly to the database 414, the cloud connector can instead use an intermediate staging area 418 and only send requests for information that is not already known to the database 414. This allows the system to respond to many queries simultaneously and to provide large data sets that are stored in the database 414 without affecting the availability or performance of the database 414 itself.

A query 402 may be received from a client 406. The query 402 may first be received by an extractor process 408 that may harmonize the result formats as described in detail below. The extractor 408 passes the query to the cloud connector 416 through a Web Services API to extract data from a View Object using the pre-built query that was generated during the design phase. The cloud connector 416 adjusts the query to retrieve only the data that has been modified since the last time queries for the same data were made. The cloud connector 416 logs every query that is received for the database 414, therefore the cloud connector 416 can compare current queries to previous queries to identify overlapping requests in the results. The cloud connector 416 can adjust the query such that only data that is not already received and stored in the staging area 418 is requested. Additionally, the cloud connector 416 can adjust the query to retrieve data that is expired or changed that already exists in the staging area 418.

The modified query 403 can then be passed to the database 414 and the results 405 can be received by the cloud connector 416. Because the corresponding View Object is not persistent, the cloud connector 416 can store the results 405 as a .CSV files 404 in the staging area 418. The staging area 418 may comprise a plurality of .CSV files. The file name for the .CSV file 404 may include a name for the View Object and a timestamp of the extraction.

At this point, the results for the query 402 may be stored in one or more of the .CSV files in the staging area 418. However, the result sets that were previously stored in the staging area 418 may have changed schemas or otherwise have a different format from the format of the .CSV file 404 with the current results 405. For example, the other .CSV files may have a different number of columns, different column names, different data types stored in the columns, different column orders, and so forth. Therefore, prior to this disclosure it was impossible to present a full result set in a uniform package.

To overcome this problem, the extractor 408 can receive a notification that the extraction is complete. The extractor 408 can then search or request all of the files that make up the complete data set in the staging area 418. This may include a combination of files from the most recent query, such as the .CSV file 404, as well as other .CSV files from previous queries. The extractor 408 may inspect the format of each file by examining the headers, and may group files with matching columns together. For example, the extractor 408 clusters groups of .CSV files together that have similar formats based on, for example, column numbers and/or field types. If any of the headers contain columns that are not in the original metadata definition received during the design time step, then a current version of the metadata can be requested via the REST API of the cloud connector 416. The current version of the metadata 412 can be returned to the extractor 408 to harmonize the results.

The code to load data into the client system 406 may then be generated on-the-fly. This code may be generated by using the definition of each group of files as found in the file header for the group. This definition can be augmented with data type information from the original View Object metadata and the most recent View Object metadata definition received in the updated metadata 412. Specific examples of this process are described in greater detail below. This allows the extractor 408 to generate a final result set 410 can be presented in a uniform View and coherent fashion to the client 406 in response to the original query 402.

In some embodiments, the system may use the harvested cloud connector 416 data entity definition to generate code to create an external table that would extract the data from .CSV files that were staged in the object storage of the staging area. However, when the ordering of the fields in the .CSV files is not guaranteed to be consistent with the order originally given via the Rest API, the system may need to perform an additional examination of the .CSV file header to ensure the data is loaded into the target correctly. This would normally be sufficient, except that the system does not get only one .CSV file for each query. As described above, the extractor 408 receives a plurality of .CSV files that may have to be combined to form the result set. Moreover, each of the .CSV files may have different field ordering and the .CSV files may even contain different sets of fields (i.e., "schema drift").

The solution of combining the various .CSV files includes generating code using the harvested data entity definition in the .CSV header. First, it should be noted that if the extractor 408 knew that all of the .CSV files had the same columns in the same order, it could generate the external table definition by combining the ordered list of columns from one of the .CSV headers (used for the external table field_list) and the columns and datatypes from the DIPC data entity (used for the external table column_list).

The following examples show how multiple previous result sets can be merged together to be responsive to a current query. When a current query is received, it may be reformatted such that it does not overlap with any previous queries. The reformatted current query can then be executed on the underlying data sources tied to the view on which the request was received. The results can then be stored in the staging area or a similar data storage area along with the previous result sets. The current result set and the previous result sets can then be merged together to generate a final result set to be responsive to the top-level query. In the following examples, different types of schema changes may take place between the previous result sets and the current result set. Each of these examples may assume that the current result set has been received and stored in the staging area. At this point, the current result set may be treated just like any of the previous result sets. Therefore, in the examples below, all of the result sets in the staging area may be referred to as "previous result sets" even though one of those result sets may be from a current query. Therefore, each of the examples below illustrate how to combine "previous result sets" which may necessarily include any new data received as a current result set in response to a reformatted current query.

Figure 5A:
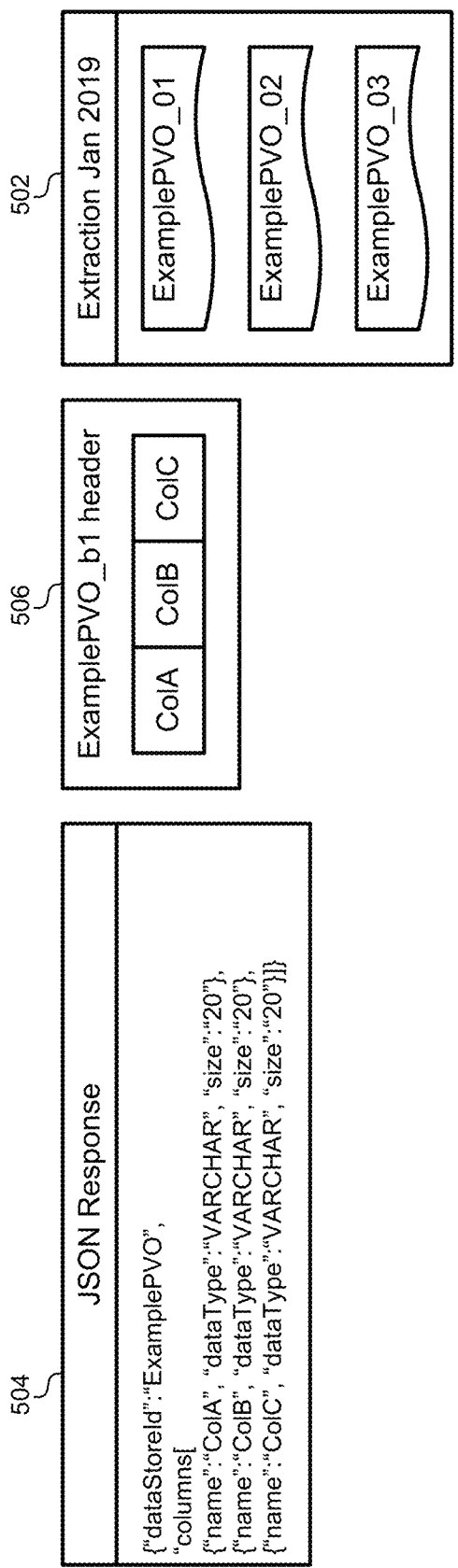
FIG. 5A illustrates an example of an external table that would result from result sets with uniform column definitions, according to some embodiments.

FIG. 5A illustrates an example of an external table that would result from result sets with uniform column definitions, according to some embodiments. Again, when loading multiple files, this assumes that all the .CSV files have the same columns in exactly the same order. However, this restriction is not always reasonable because the extraction method used by the cloud connector may only query the database for data that it has not previously queried and stored as cached .CSV files in the staging area. Therefore, all these existing .CSV files should be included when generating the result set from the query. This does improve query performance but it comes at the cost that it cannot be guaranteed that the .CSV files match in terms of the column definition. The method above using both the .CSV header and data entity definition may need to be altered to account for this potential mismatch in some cases described below.

This example includes a schema definition 504 previously retrieved from the one or more data sources. This schema definition 504 may be retrieved prior to executing queries for this view object. Thus, the schema definition 504 may be received prior to receiving any previous result sets. One or more previous result sets may have been received in response to one or more queries submitted to the view object in the past. The schema definition 504 may define a structure of a response from the data sources. For example, the schema definition 504 may include names for each of the columns, datatypes for each of the columns, data widths for each of the columns, an order of each of the columns, and/or any other characteristic of a result set received from a query from the data sources.

As described above, previous result sets may be stored in a location outside of the data sources, such as the staging area described above. Some embodiments may store these previous result sets as .CSV files that do not overlap with any previous data sets already stored in the staging area. When receiving a query, the system may first determine whether any previous queries with result sets stored in the staging area can be responsive to at least a portion of the current query. In this example, the combination of a plurality of result sets in the staging area can be grouped together to be responsive to the query.

One or more previous result sets 502 may be grouped together based on a number of different characteristics. For example, some embodiments may group the previous result sets 502 together based on a label or file name for each of the result sets. The filename may include an identifier and/or a reference to the view object for the current query. Thus, the previous result sets 502 may be grouped initially based on a view identifier that matches the view of the current query. Note that many different view objects may be available in the system, and queries may be submitted on each of these view objects. The staging area may receive queries on a number of different view objects. However, only previous result sets 502 executed on the same view as the current view should be used to generate a final result set. Some examples may further group the previous result sets 502 by a batch number or by a timestamp that indicates they were submitted close to each other in time. It may be assumed that the schema for the result sets retrieved close to each other in time has not changed.

Some embodiments may also compare a column header for each of the previous result sets 502 to a column header for a current result set. The previous result sets 502 may further be grouped together based on common column headers. In this example, each of the previous result sets 502 includes the same column header 506 with column A, column B, and column C arranged in sequential order. Because the grouping resulted in only a single group of previous result sets 502, no combination of groups is necessary. Instead, the previous result sets 502 may be merged and presented as a response to the top-level query. Further examples described below include cases where the grouping of previous result sets generates multiple groups.

FIG. 5B illustrates an example of code that may be automatically generated to provide a result table based on the previous result sets 502, according to some embodiments. For each group of previous result sets identified above, the system may generate code 508 that is configured to generate a result table from the files containing the previous result sets 502. In this example, the code 508 includes commands that create an external data table named EXAMPLE with a SECURE credential. The data source for loading information into the table is the ExamplePVO*.csv files that are part of the batch of previous result sets 502 in FIG. 5A. The code 508 may load information from each of the files matching the filename (with the wildcard *) into the newly created data table.

The column list for the new data table may be extracted from the schema definition 504 described above. This ensures that the new data table includes columns, datatypes, data widths, and column orders that match the column schema of the previous result sets. The code 508 may also include a field list that defines an order for the fields taken from the previous result sets. Instead of being based on the schema definition 504, the field list may be based on the column header 506 from the previous result sets. As will be described below, this enables the system to reorder columns when the schema changes between result sets.

In this example, the column headers in each of the .CSV files match. At this point, the extraction is complete, and the header information includes three columns (A, B, C). The metadata in the JSON response for the schema definition 504 also includes these three matching columns. The extraction results in the previous result sets 502 indicate that three result files have been found to include data that is responsive to the query. They have all been grouped together because they include the same column definitions. Therefore, the system can generate code 508 that loads all of these result files into a single external table to house the results. At this stage, the resulting table generated by the code 508 can be returned in response to the top-level query.

Figure 6A:
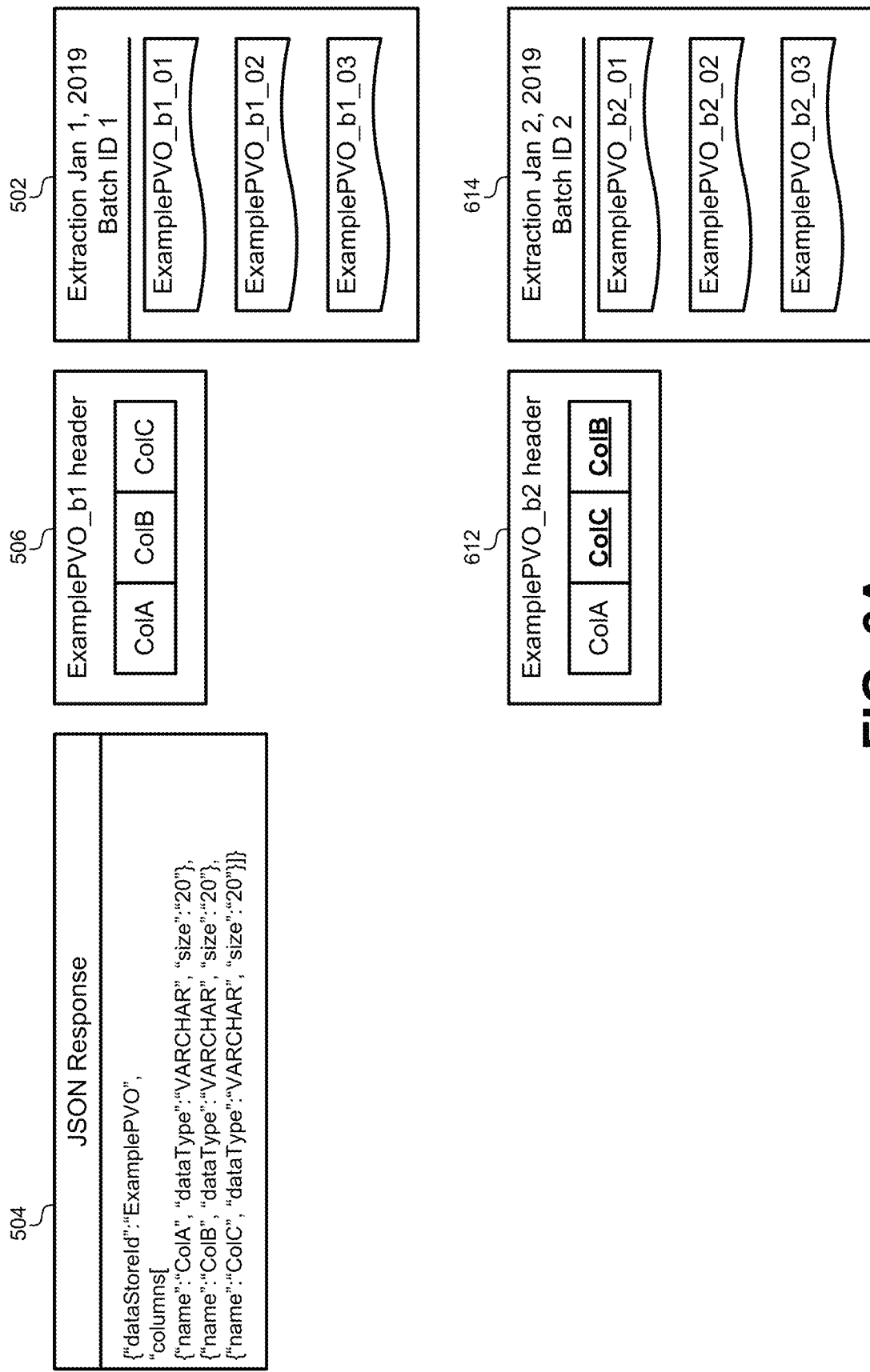
FIG. 6A illustrates a more complex situation where there are two different column definitions in the previous result sets, according to some embodiments.

FIG. 6A illustrates a more complex situation where there are two different column definitions in the previous result sets, according to some embodiments. Here, the system determines that previous result sets created by the same view object query may have the same column definition. These can be identified by the "Batch Number" that has been added to each of the groupings 502, 614 of previous result sets. As described above, the system may first identify previous result sets that match the current view object. Next, the system may group these previous result sets (e.g., stored in .CSV files) into groupings based on batches.

This example illustrates a first batch of result sets 602 on Jan. 1, 2019 and a second batch of result sets 614 on Jan. 2, 2019. The first batch of result sets 502 may be the same as the previous result sets 502 described above in FIGS. 5A-5B. As described above, the previous result sets 502 may include a column header 506 with columns that match the original schema definition 504. However, the second batch of previous result sets 614 may include column headers 612 that changes the order of the columns, swapping column C and column B. The system can first group all of the previous result sets 502 from the first batch of extractions because they will have the same column definitions. The system can then group all of the previous result sets 614 from the second batch of extractions 614 because they also will have the same column definitions.

Figure 6B:
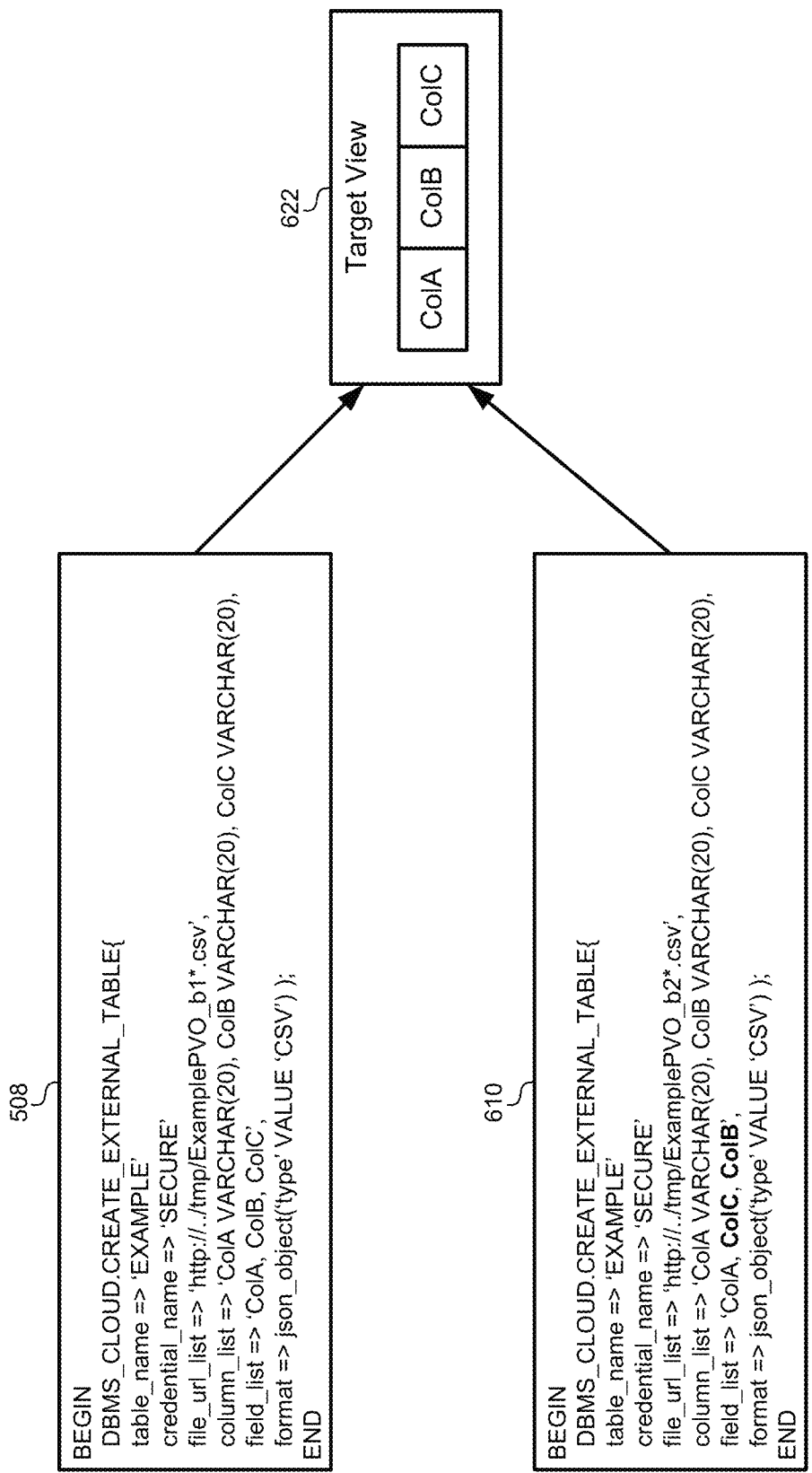
FIG. 6B illustrates two different blocks of code generated to display the combined results of the two batches of previous result sets, according to some embodiments.

FIG. 6B illustrates two different blocks of code 508, 610 generated to display the combined results of the two batches of previous result sets, according to some embodiments. In the example above FIG. 5B, all of the previous result sets could be handled using a single block of code 508 because they all had the same schema. However, in this example, the two batches of result sets have different schemas. This indicates that the schema of the underlying data sources may have changed between the first extraction on January 1 and the second extraction on January 2. This resulted in result sets having different column names, different column orders, and so forth. Therefore, two different blocks of code may be used to generate two separate tables to be merged for a result set.

Code 508 is the same as described above in FIG. 5B, and it is configured to generate a new external data table that merges all of the results in the first batch of previous result sets 502. The only changes are that the filename for the source data file has added the "_b1" identifier to distinguish this result set from other result sets in the staging area. Code 610 is a new block of code that generates a new table that merges all of the results in the second batch of previous result sets 614. This code 610 performs similarly to the code 508, the difference being that the source filename loads all of the code from the batch using the "_b2" identifier in the filename. Additionally, the field list for the columns uses the order of the columns in the header 612 for the second result set. This effectively reorders the columns in the resulting data table generated by the code 610.

After the code 508 and the code 610 have reordered the columns to be uniform, a new view object 622 may be generated to create a single view of the two data tables created by the code 508, 610. The view 622 can then be returned as a response to the top-level query. When accessing the view 622, the requesting system may view the combination of various result sets as a single result set, without being exposed to any of the underlying details of how they were created by merging result sets in the staging area and creating new data tables/views.

Figure 7A:
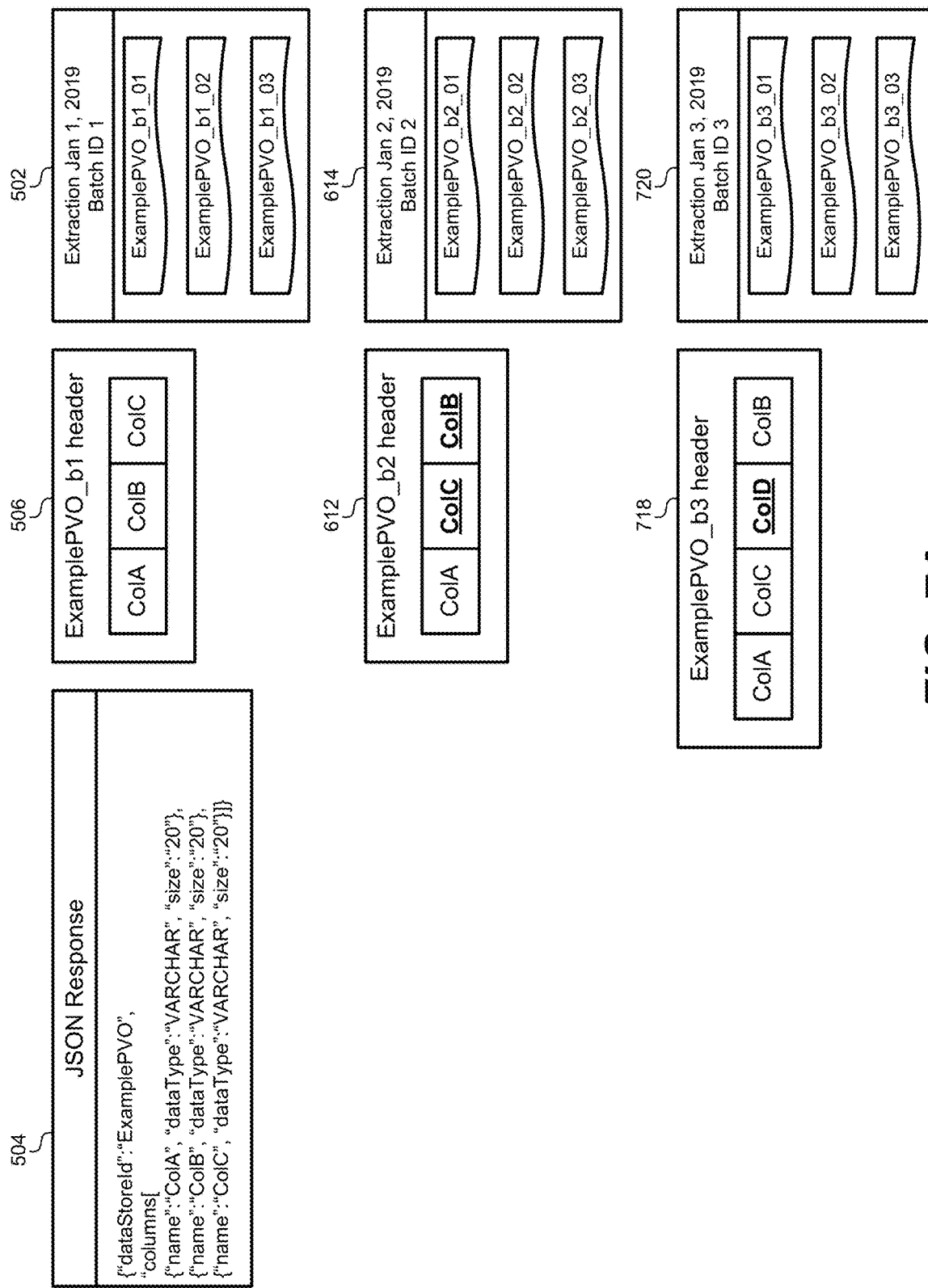
FIG. 7A illustrates a situation with three different column definitions in the previous result sets, according to some embodiments.

FIG. 7A illustrates a situation with three different column definitions in the previous result sets, according to some embodiments. In this situation, columns have been swapped between a first extraction 502 and a second extraction 614 as described above, and a new column has been added between the second extraction 614 and a third extraction 720. There are two issues to consider when dealing with schema drift. First, the system should not crash when it happens. Second, the system should accommodate additional (or missing) columns during the load. Along the potential for the order of the columns to be different in each batch, there is also the possibility that there may be a different set of columns altogether. The View Objects may each have a large number of columns, and it may be up to the cloud connector administrator to choose which ones to enable and which to hide. Typically, any unused fields may be hidden, and there may be many others that are hidden by default.

The harvested metadata is a snapshot of the definition at a point in time. However, it is entirely possible that between extraction batches there could be a change in the columns that are hidden or exposed. This means there may be cases where the .CSV files may not all have the same columns. Alternatively or additionally, some of the columns may not appear in the metadata definition. In this example, there is no metadata definition (other than the .CSV header) for the ColD column.

In this example, a third batch containing a result set 720 may include a plurality of previous result sets having a column header 708 that adds an additional column to the data. In other words, the rows in the previous result sets 720 will include an extra column that is not present in the other previous result sets 502, 614. A setting may control whether the data for this additional column is included in the final result set responsive to the top-level query, or whether the data in this additional column is ignored.

Figure 7B:
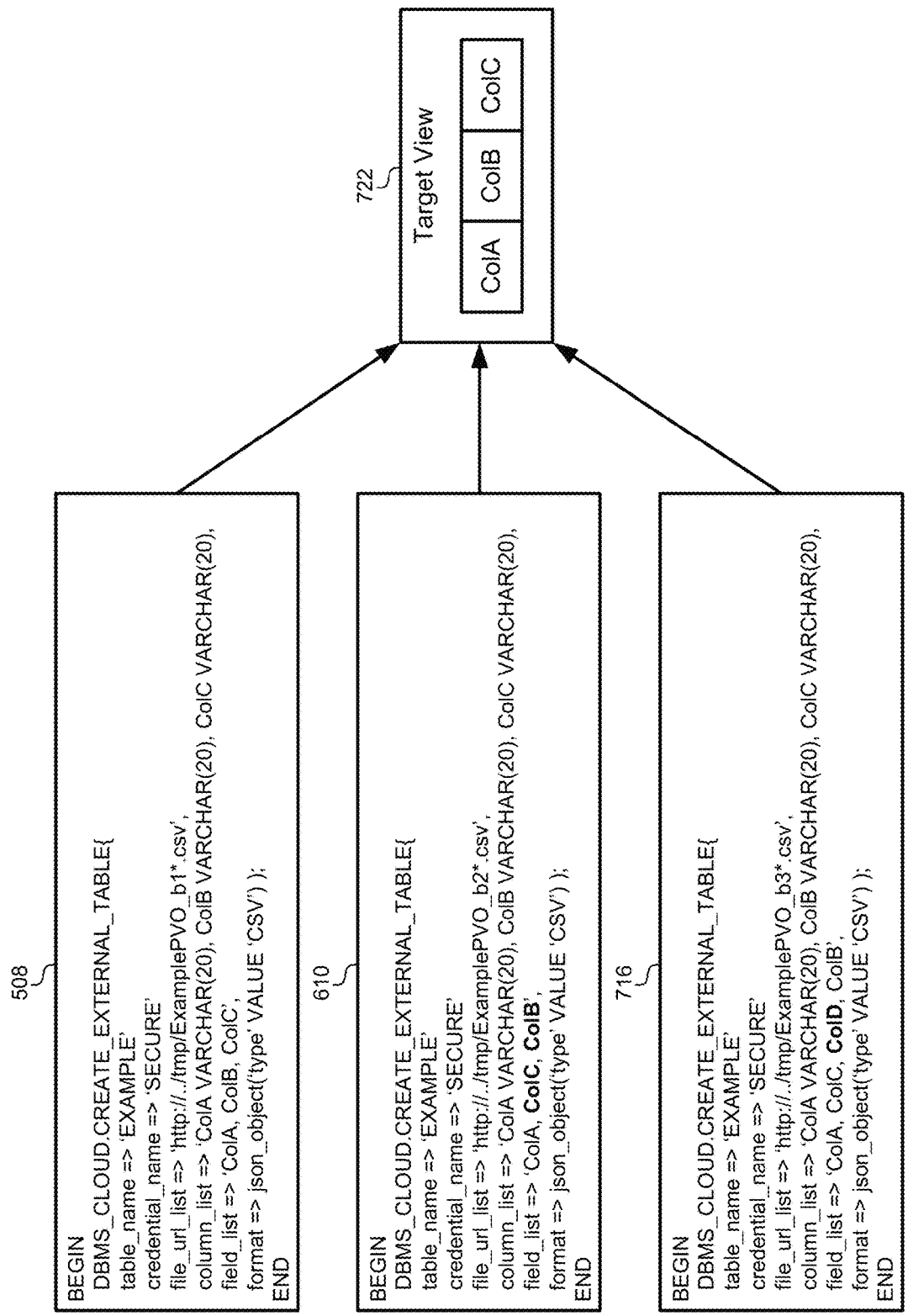
FIG. 7B illustrates code generated to merge the three result sets from FIG. 7A, according to some embodiments.

FIG. 7B illustrates code generated to merge the three result sets from FIG. 7A, according to some embodiments. Code 508 and code 610 are the same as described above in FIG. 6B. Code 716 is similar except that the source file uses the filename (including the wildcard*) for each of the previous result sets 720 from the third batch. Note that the column list in code 716 only defines the three columns for column A, column B, and column C. The data for the new column D is not given a column in the data table generated by code 716. Similarly, the target view 722 only includes columns A, B, and C. In this example, the data for column D is omitted from the target view 722 presented in response to the top-level query.

Figure 8:
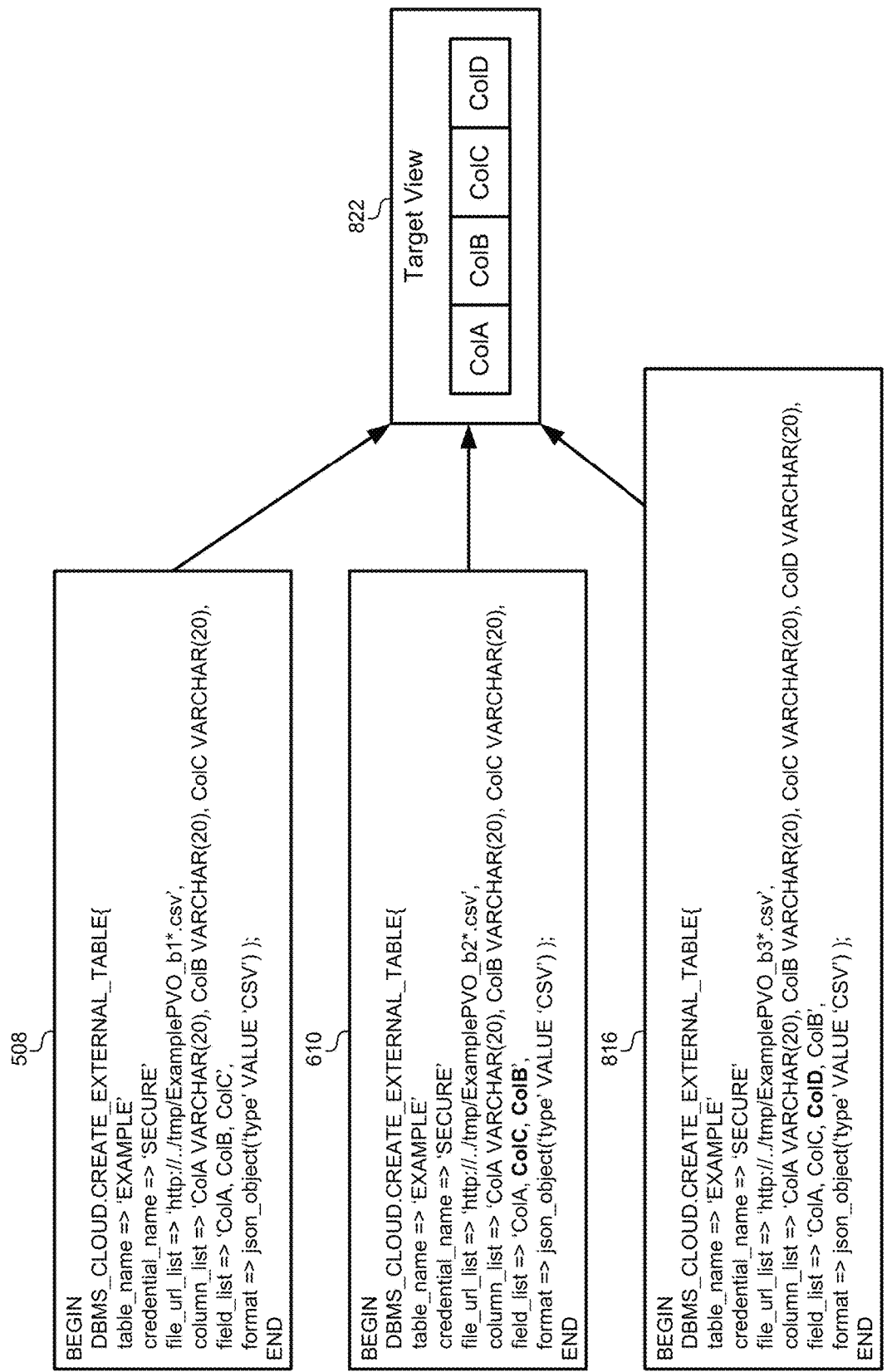
FIG. 8 illustrates a second target view that accommodates an added column, according to some embodiments.

FIG. 8 illustrates a second target 822 view that accommodates an added column, according to some embodiments. Instead of ignoring the new column D added to the schema of the data source, the code 816 instead defines a new column D in the column list. To strongly support schema drift, the system may load any additional columns added after the last harvesting took place. In some embodiments, a new version of the schema metadata definition may be requested at runtime by the system from the data source. This new schema definition may include the updated definitions for the column list included in code 816. The column list from the schema can be copied into the code 816 generated to handle the extra column. The field list may continue to be taken from the column headers 718 of the third batch of previous result sets 720. The external table may ensure that the field list correctly resembles the result set files, but it may also build a column definition that includes the extra columns as well to become part of the data load. In this example, the new target view 822 also adds the new column D from the third batch of previous result sets 720.

Figure 9:
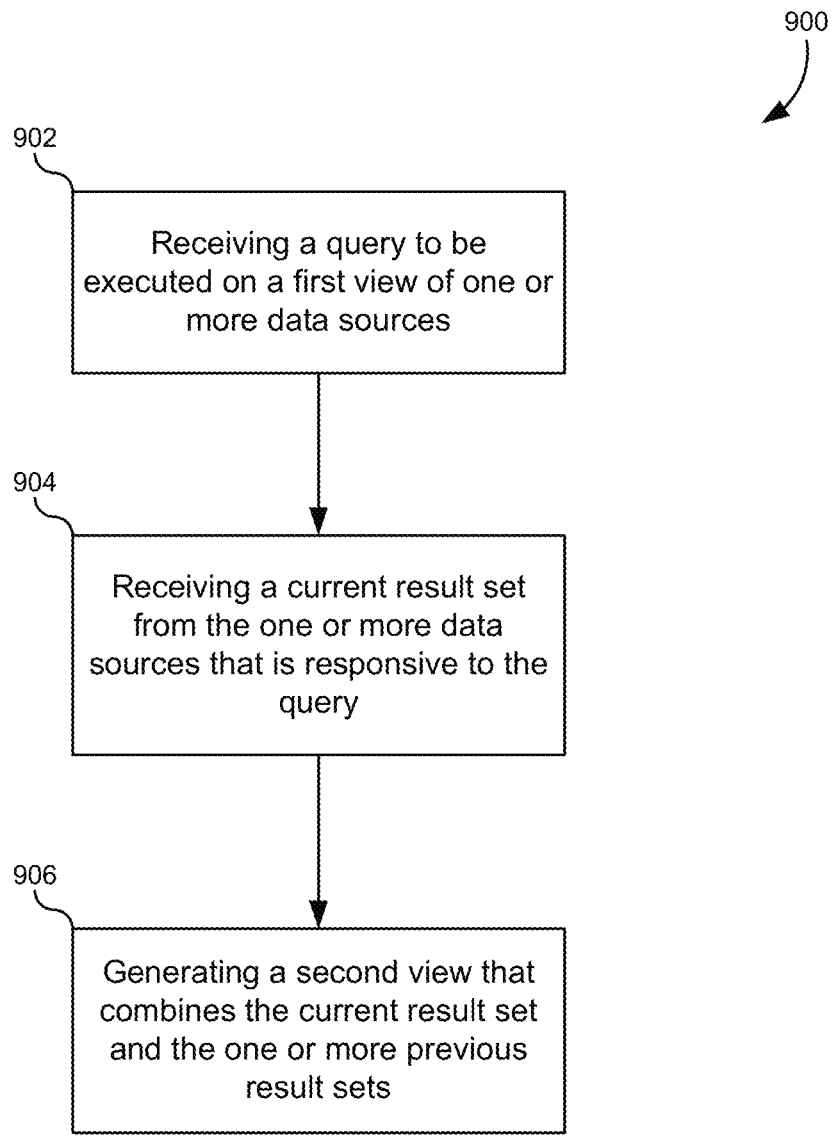
FIG. 9 illustrates a flowchart of a method for efficiently extracting large data sets from data stores, according to some embodiments.

FIG. 9 illustrates a flowchart of a method for efficiently extracting large data sets from data stores, according to some embodiments. The method may include receiving a query to be executed on a first view of one or more data sources (902). The view may include a View Object as described above. The view may include SQL code that queries one or more data sources. The one or more data sources may include Web services, databases, XML files, structured and/or unstructured data repositories, websites, and so forth. In some embodiments, one or more queries may have previously been executed on the first view. For example, previous queries may include queries on the data represented by the view for a timeframe that occurred in the past. In response to the one or more previous queries, one or more result sets resulting from those queries may be stored separately from the one or more data sources. For example, the previous result sets may be stored in files, such as .CSV files and stored in a separate data repository, such as the staging area described above.

The method may also include receiving a current result set from the one or more data sources that is responsive to the query (904). In some embodiments, the query may be reformatted before the query is executed on the one or more data sources such that the result set does not overlap with the one or more previous result sets. For example, the system may include a record of all previous queries received on a particular view. A previous query may include data from a first date range, and the current query may include data from a second date range. The current query may be reformatted to exclude data from the second date range that overlaps with the first date range. The overlapping data may already be stored in the staging area in a previous result set. This reduces the size of the data that is retrieved from the one or more data sources.

The method may additionally include generating a second view that combines the current result set and the one or more previous result sets (906). In many cases, the schema for the underlying data sources may have changed between the previous result sets and the current result set. This change may include added columns, removed columns, changed column names, reordered columns, and/or other schema changes. The second view may resolve the changes in schema by generating code that creates new result data tables that have column definitions based on the schema associated with the corresponding result set, and column field lists to populate the columns based on the headers in the result sets. A new view may be created that draws results from both of the newly generated data tables. In some cases, the previous result sets may be grouped together by batch number and/or by common column definitions in the column headers to share the new tables.

It should be appreciated that the specific steps illustrated in FIG. 9 provide particular methods of efficiently extracting large data sets from a database according to various embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 10:
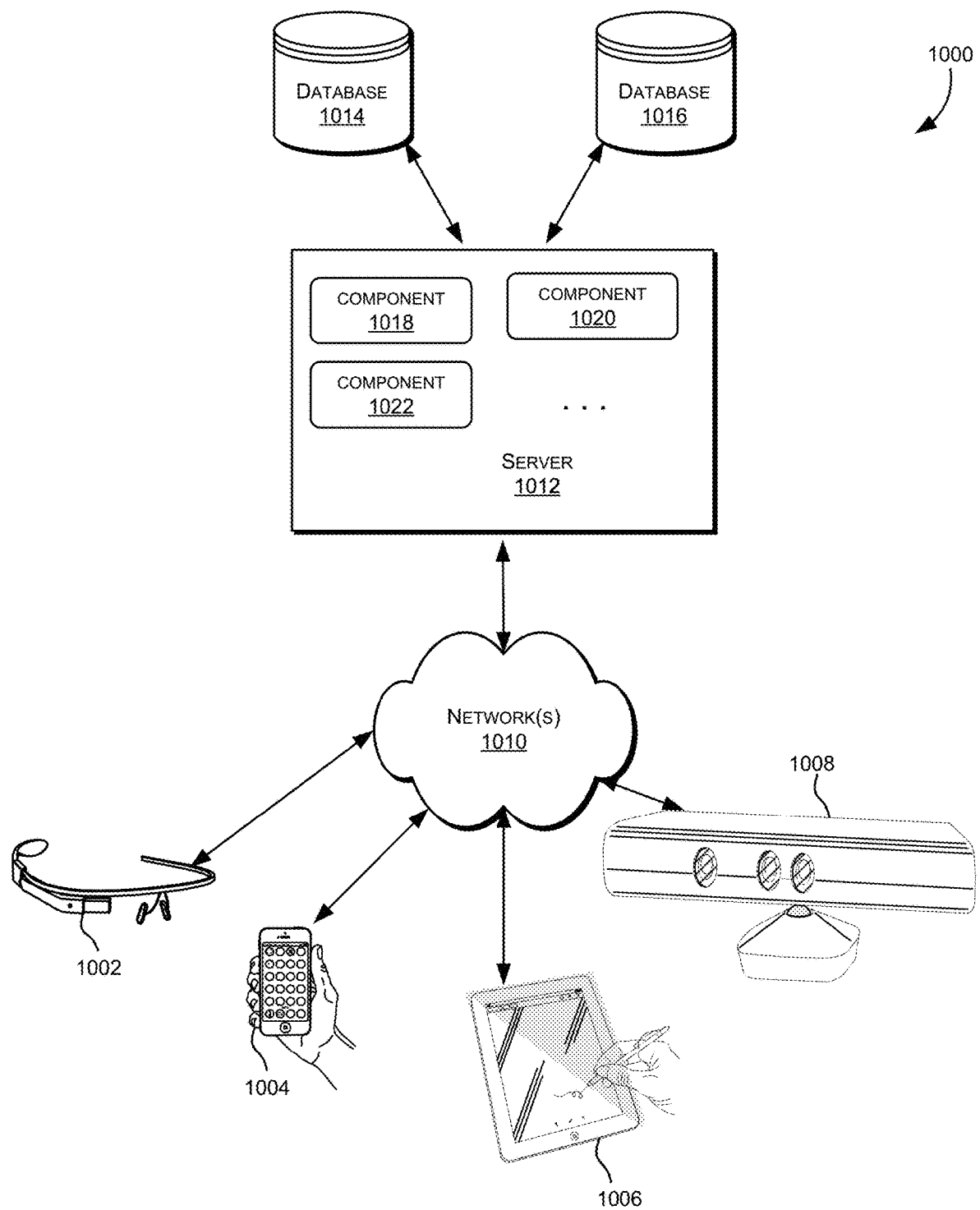
FIG. 10 illustrates a simplified block diagram of a distributed system for implementing some of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
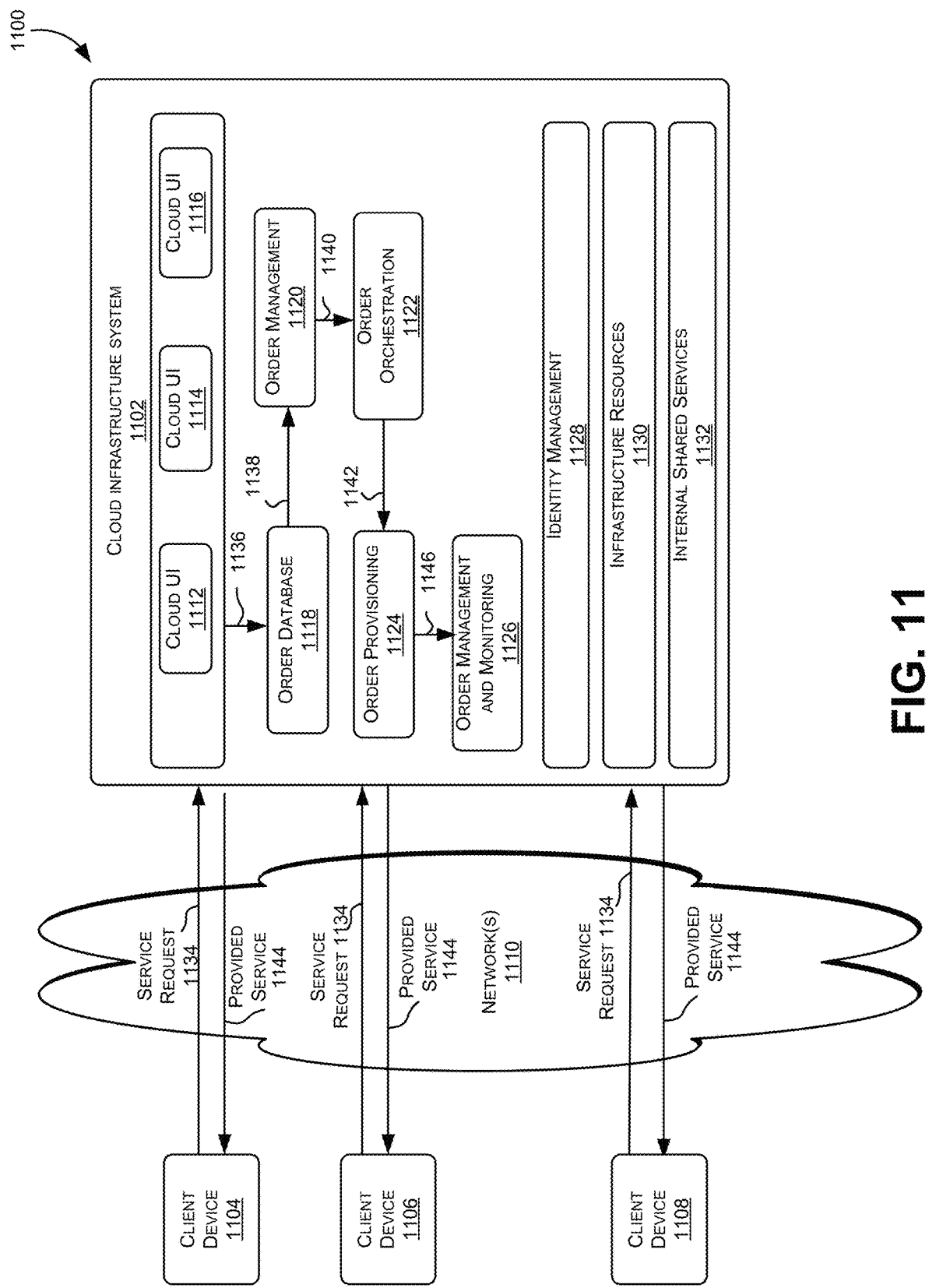
FIG. 11 illustrates a simplified block diagram of components of a system environment by which services provided by the components of an embodiment system may be offered as cloud services.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
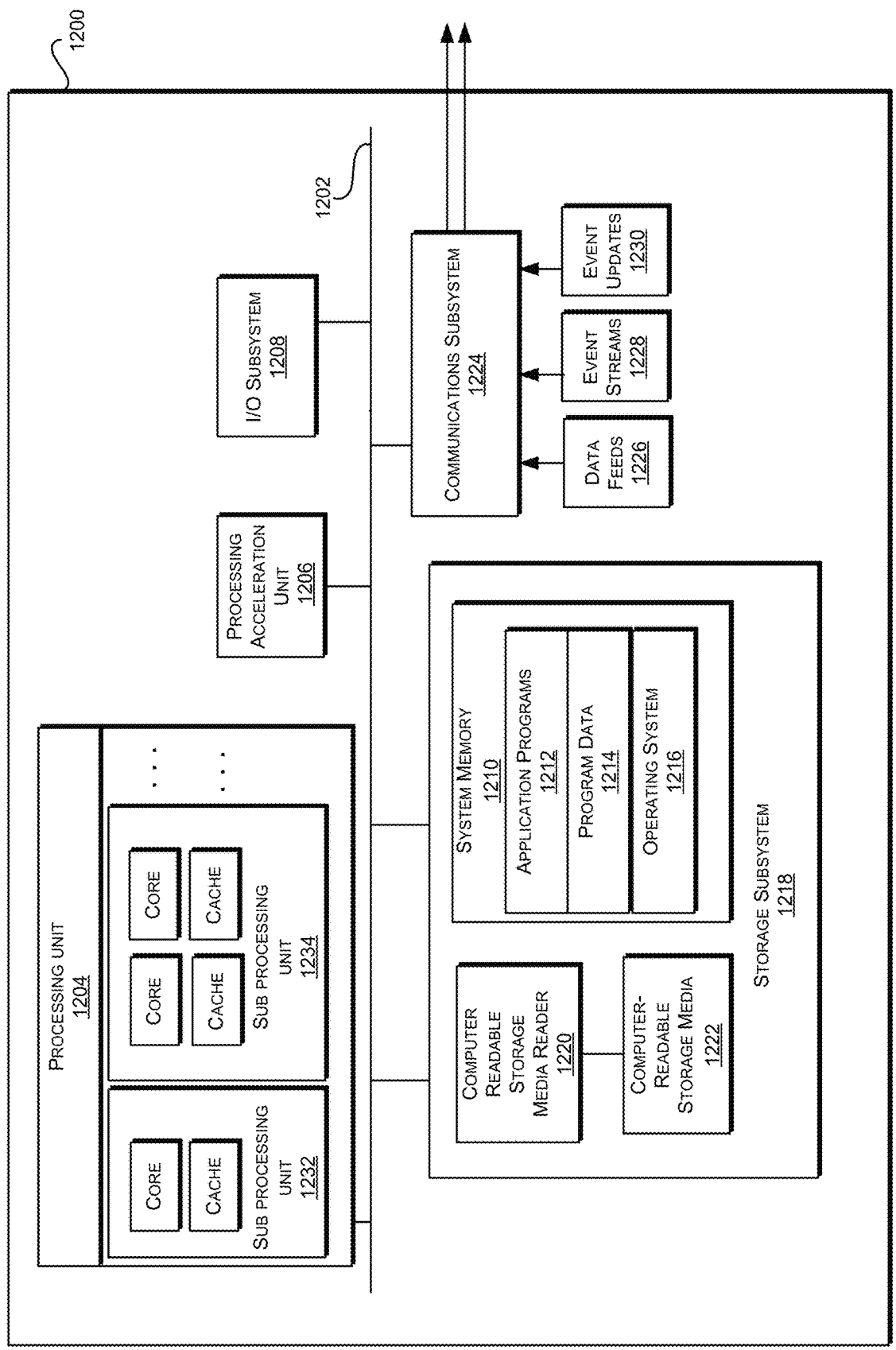
FIG. 12 illustrates an exemplary computer system, in which various embodiments may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of efficiently extracting large data sets from data stores, the method comprising:
    receiving a first data table that stores a first result set from a first query executed on one or more data sources, wherein the one or more data sources use a first schema when the first query was executed;
    receiving a second result set from a second query executed on the one or more data sources, wherein the one or more data sources use a second schema when the second query was executed, the first result set is stored in a staging area that is separate from the one or more data sources between when the first query is executed and when the second query is executed, and the second result set does not overlap with the first result set;
    automatically generating code that creates a second data table external to the one or more data sources to store the second result set, wherein the second data table modifies an organization of columns in the second result set to resolve differences between the first schema and the second schema; and
    generating a view object that combines views of the first data table and the second data table, wherein the view object is displayed as a single result table having a single schema.

2. The method of claim 1, further comprising receiving the first schema for the one or more data sources when one or more data sources use the first schema.

3. The method of claim 2, further comprising receiving the second schema for the one or more data sources when one or more data sources use the second schema.

4. The method of claim 1, wherein the second data table reorders columns that are in the first result set.

5. The method of claim 1, wherein the second data table adds an additional column that was not part of the first result set.

6. The method of claim 5, wherein the view object does not include the additional column.

7. The method of claim 1, further comprising identifying the first result set from among a plurality of previous result sets using an identifier.

8. The method of claim 7, further comprising identifying the first result set from among the plurality of previous result sets by grouping batches of result sets with same column headers.

9. A non-transitory computer-readable medium comprising instructions that, when executed by one or more processors, cause the one or more processors to perform operations comprising:
    receiving a first data table that stores a first result set from a first query executed on one or more data sources, wherein the one or more data sources use a first schema when the first query was executed;
    receiving a second result set from a second query executed on the one or more data sources, wherein the one or more data sources use a second schema when the second query was executed, the first result set is stored in a staging area that is separate from the one or more data sources between when the first query is executed and when the second query is executed, and the second result set does not overlap with the first result set;
    automatically generating code that creates a second data table external to the one or more data sources to store the second result set, wherein the second data table modifies an organization of columns in the second result set to resolve differences between the first schema and the second schema; and
    generating a view object that combines views of the first data table and the second data table, wherein the view object is displayed as a single result table having a single schema.

10. The non-transitory computer-readable medium of claim 9, wherein the operations further comprise:
    generating code that creates the first data table.

11. The non-transitory computer-readable medium of claim 9, wherein the one or more data sources are upgraded from the first schema to the second schema between executing the first query and executing the second query.

12. The non-transitory computer-readable medium of claim 9, wherein the operations further comprise reformatting the second query before the second query is executed on the one or more data sources.

13. The non-transitory computer-readable medium of claim 9, wherein the second data table reorders columns that are in the first result set.

14. The non-transitory computer-readable medium of claim 9, wherein the second data table adds an additional column that was not part of the first result set.

15. The non-transitory computer-readable medium of claim 14, wherein the view object does include the additional column.

16. A system comprising:
    one or more processors; and
    one or more memory devices comprising instructions that, when executed by the one or more processors, cause the one or more processors to perform operations comprising:

receiving a first data table that stores a first result set from a first query executed on one or more data sources, wherein the one or more data sources use a first schema when the first query was executed;

receiving a second result set from a second query executed on the one or more data sources, wherein the one or more data sources use a second schema when the second query was executed, the first result set is stored in a staging area that is separate from the one or more data sources between when the first query is executed and when the second query is executed, and the second result set does not overlap with the first result set;

automatically generating code that creates a second data table external to the one or more data sources to store the second result set, wherein the second data table modifies an organization of columns in the second result set to resolve differences between the first schema and the second schema; and generating a view object that combines views of the first data table and the second data table, wherein the view object is displayed as a single result table having a single schema.

17. The system of claim 16, wherein the operations further comprise:
generating code that creates the first data table and the second data table.

18. The system of claim 16, wherein the second data table adds an additional column that was not part of the first result set, and the view object does include the additional column.

19. The system of claim 16, wherein:
the one or more data sources are upgraded from the first schema to the second schema between executing the first query and executing the second query; and
the operations further comprise reformatting the second query before the second query is executed on the one or more data.

* * * * *

UNITED STATES PATENT AND TRADEMARK OFFICE
CERTIFICATE OF CORRECTION

PATENT NO. : 11,934,395 B2
APPLICATION NO. : 17/893116
DATED : March 19, 2024
INVENTOR(S) : Scott It is certified that error appears in the above-identified patent and that said Letters Patent is hereby corrected as shown below:

On the Title Page

On page 2, Column 1, under item (56) U.S. PATENT DOCUMENTS, Line 1, insert
-- 8463770 A1 6/2013 Thirumalai et al.
8661033 A1 2/2014 Leppert et al.
10223076 A1 3/2019 Owen et al.
10237152 A1 3/2019 Fan et al.
10459918 A1 10/2019 Edwards Jr. et al.
11423020 A1 8/2022 Scott --.

In the Drawings

On sheet 3 of 15, in FIG. 3, under Reference Numeral 316, Line 1, delete "DPIC" and insert
-- DIPC --, therefor.

In the Specification

In Column 14, Line 49, delete "Internet" and insert -- Internetwork --, therefor.

In Column 14, Line 59, delete "Electronics" and insert -- Electronics Engineers --, therefor.

In Column 23, Line 20, delete "evolution)," and insert -- evolution)), --, therefor.

Signed and Sealed this
Twenty-seventh Day of August, 2024

Katherine Kelly Vidal
*Director of the United States Patent and Trademark Office*